US011905731B2

(12) United States Patent
Koenig et al.

(10) Patent No.: US 11,905,731 B2
(45) Date of Patent: Feb. 20, 2024

(54) DOOR FITTING HAVING A HANDLE WHICH CAN BE LOCKED ON ONE SIDE

(71) Applicant: Griffwerk GmbH, Blaustein (DE)

(72) Inventors: Andreas Peter Koenig, Blaustein (DE); Maximilian Mun-Ratberger, Neu-Ulm (DE); Matthias Lamparter, Blaustein (DE)

(73) Assignee: GRIFFWERK GMBH, Blaustein (DE)

( * ) Notice: Subject to any disclaimer, the term of this patent is extended or adjusted under 35 U.S.C. 154(b) by 404 days.

(21) Appl. No.: 17/309,326

(22) PCT Filed: Nov. 21, 2019

(86) PCT No.: PCT/EP2019/082154
§ 371 (c)(1),
(2) Date: May 19, 2021

(87) PCT Pub. No.: WO2020/104622
PCT Pub. Date: May 28, 2020

(65) Prior Publication Data

US 2022/0010588 A1 Jan. 13, 2022

(30) Foreign Application Priority Data

Nov. 22, 2018 (DE) ..................... 10 2018 129 450.6

(51) Int. Cl.
*E05B 13/00* (2006.01)
*E05B 41/00* (2006.01)
(Continued)

(52) U.S. Cl.
CPC ............ *E05B 13/002* (2013.01); *E05B 41/00* (2013.01); *E05B 47/0038* (2013.01); *E05B 65/0035* (2013.01); *E05B 2065/0039* (2013.01)

(58) Field of Classification Search
CPC ...... E05B 13/00; E05B 13/002; E05B 13/004; E05B 41/00; E05B 47/00; E05B 47/0038;
(Continued)

(56) References Cited

U.S. PATENT DOCUMENTS 7,934,754 B2 * 5/2011 Mathachan ........... E05B 13/002 292/336.5

FOREIGN PATENT DOCUMENTS

CN 107100432 A * 8/2017
CN 107100432 A 8/2017
(Continued)

OTHER PUBLICATIONS

EPO Search Report dated Jun. 1, 2022.

*Primary Examiner* — Nathan Cumar
(74) *Attorney, Agent, or Firm* — WELSH FLAXMAN & GITLER LLC

(57) ABSTRACT

A door fitting having a handle that can be locked on one side, including at least one rosette for contact with a door leaf and a shaft element for forming an operative connection to the locking mechanism of a lock unit fitted into the door leaf, and an adapter element being fitted in a neck section of the handle and being held on the shaft element. In order to create a simple embodiment of a handle that can be locked on one side, according to the invention, it is provided that a locking device is held in or on the neck section of the handle, which is brought by means of a manual actuation into a blocking position, in which the handle can be rotationally blocked against the rosette by means of the locking device.

13 Claims, 4 Drawing Sheets

(51) Int. Cl.
*E05B 47/00* (2006.01)
*E05B 65/00* (2006.01)

(58) Field of Classification Search
CPC ................. E05B 65/00; E05B 65/0035; E05B 2065/0039
USPC ............................................................ 70/101
See application file for complete search history.

(56) References Cited

FOREIGN PATENT DOCUMENTS

| | | | | | |
|---|---|---|---|---|---|
| DE | 202013011573 | U1 | | 2/2014 | |
| DE | 202013011573 | U1 | * | 4/2014 | ............. E05B 1/003 |
| DE | 202017102239 | U1 | | 5/2017 | |
| DE | 202017102239 | U1 | * | 6/2017 | |
| GB | 2123070 | A | * | 1/1984 | ........... E05B 13/002 |
| GB | 2123070 | A | | 1/1984 | |

* cited by examiner

DOOR FITTING HAVING A HANDLE WHICH CAN BE LOCKED ON ONE SIDE

BACKGROUND OF THE INVENTION

The invention relates to a door fitting having a handle that can be locked on one side, comprising at least one rosette for contact with a door leaf and a shaft element for forming an operative connection to the locking mechanism of a lock unit fitted into the door leaf, and an adapter element being fitted in a neck section of the handle and being held on the shat element.

A door fitting having a handle that can be locked on one side are, in particular, used for inner doors of a building, for example, for doors of sanitary rooms. As usual, the door fittings have two handles, one of which is located on each side of a door leaf when they are attached to a door leaf. However, door fittings that can be locked on one side are designed in such a that a locking on one side of one or both handles of the door fitting can be achieved on only one side in conjunction with a handle, however, on the facing-away side of the arrangement of an operating element for the locking system, the possibility to release the locking and open the door using the locked handle, for example, in an emergency, must be maintained.

For example, European Patent No. EP 3 067 491 B1 discloses a door fitting with a handle, that can be locked on one side, and the door fitting comprises rosettes on both sides for respective contact with a door leaf and a shaft element for forming an operative connection to the locking mechanism in a lock unit fitted into the door leaf. Thereby, both handles are held on the shaft element, and an operating element for creating a blocking position of at least one of the handles interacts directly with the locking mechanism of the lock unit by an actuating element protruding out of the rosette of the door fitting and being able to be axially pressed into the rosette at a longitudinal axis and be pulled out it again. The locking mechanism is designed to achieve the blocking effect with a split follower, wherein a shaft element of a first handle interacts with a first part of the follower and a second shaft element interacts with a second handle with a second part of the Follower. By pressing and pulling out the operating elements, the parts of the follower can be coupled or separated from each other. In this way, it can be achieved that the actual locking mechanism can only be activated with one of the two handles.

Another door fitting with a handle that can be locked on one side is known from German Patent No. DE 10 2007 030 655 A1. The door fitting comprises an actuating element, which can be twisted to block the handle in its longitudinal axis, whereby the depressing movement of the handle can be blocked and also be released again by rotating the actuating element back.

The well-known embodiments of door fittings with a handle that can be locked on one side are designed with a plurality of individual parts and are therefore complex to produce and assemble. In use, the well-known door fittings are prone to errors and due to the multitude of individual parts, the locking device may fail. In addition, the door fittings cannot be combined with any commercially available embodiment of a lock unit, since the locking mechanism of the lock unit or the outer dimensions of the lock unit must be adapted to the special door fitting that can be locked on one side.

SUMMARY OF THE INVENTION

It is the object underlying the invention to further develop a door fitting, in particular, for an inner door of a building with a handle that can be locked on one side, in such a way that the door fitting is designed in a simple manner with the locking device, and a locking of the handle is made possible without the locking mechanism and, in particular, without the lock unit having to be adapted to the locking device of the door fitting. In addition, the door fitting should be able to retain a simple and modest design without separate operating elements, in particular, being directly perceived as an additional component of the handle in addition to the handle.

The invention encompasses the doctrine that a locking device is held in or on the neck section of the handle, which is brought by manual actuation into a blocking position, in which the handle can be rotationally blocked against the rosette by means of the locking device.

The core idea of the invention is the integration of a locking device in the neck section of the handle, which, depending on the design of the door fitting, as a basic component for example, forms a cylinder body or an oblong body with an oval or rectangular cross-section. For example, handles are known to be L-shaped and comprise a depressing section and an angled neck section, wherein the depressing section is used for manual operation and wherein the neck section extends approximately transversely to the depressing section at the same longitudinal axis as well as the shaft element, which passes through the door leaf and thus also the lock unit.

A special advantage lies in the locking option of the handle, which is independent of the lock unit. With the door fitting according to the invention, different door thicknesses can cover in a thickness difference of, for example, 9 mm (exemplarily designed with a thickness of 35 mm to 44 mm) without additional components or special assembly.

In the sense of the invention, a rosette forms one or a plurality of components, which is or are mounted in front of the lock case in, on or in front of the door leaf. Thereby, the locking of the handle on a flat rosette can be carried out. For example, with a thickness of 2 mm to 3 mm. In addition, or as an alternative, the rosette can also be designed as a screw rosette, a clip rosette, or another rosette. The locking of the handle and, ultimately, of the locking device can also occur, for example, in a glass door lock case if the rosette or an identically functioning component is integrated, in particular, for the rotatable holding of the neck section of the handle in the lock case housing or as part of it. In particular, the rosette can be a multiple of parts, wherein the locking of the locking device can occur in or on only one component of the multi-part rosette.

Another favourable aspect of the door fitting according to the invention lies in the minimalist construction and, reducing the components, it is possible to design the entire locking mechanism at a small scale that it is not visible except for the operating element, and the visible substructure, such as the rosette for example, must be only designed with an exemplary thickness of 2 mm. This also allows the design of handles that completely obscure the substructure and a locking system is integrated into the handle. This means that the key rosettes can also be dispensed with, for example, in the case of toilet-room doors, which can thus correspond even better to the minimalist design of a door fitting desired on the market.

According to the invention, the locking device should be held in or on the neck section so that this can be moved in and out of a blocking position so that the locking device in the blocking position can rotate the handle on the rosette. The rosette is, in the sense of the invention, a component of the door fitting, which is attached only to the outside of door leaf and does not protrude into it, except with moulded screw bosses. The rosette comprises holder openings for the handles, in which the neck section of the handles is rotatably held and/or mounted with the end side.

The rosette can also be composed of multiple parts and can comprise a reinforcement element as a base body, which is mounted on the door leaf and which is provided with an outer covering, which is also understood as part of the rosette in the present case.

The adapter element serves, in particular, as an intermediate element between the shaft element and the handle, and the neck section can be hollow so that the adapter element is held in the neck section of the handle in a twist-resistant manner. Thereby, the advantage is used that the locking device is arranged, inside or on the neck section or inside or on the adapter element, and the locking device can be moved manually into the blocking position and also out of this again.

The mobility of the locking device does not necessarily have to occur at the longitudinal axis, and it is also conceivable to connect the locking device to the neck section of the handle or to hold it in the neck section in such a way that this can trigger the locking of the handle on the rosette via a rotational movement at the longitudinal axis or via an axis pressure movement that runs transversely to the longitudinal axis. In this case, the locking device can be received both in or on the neck section itself as well as in or on the adapter element.

Being particularly favourable, the locking device is formed by means of a slide element, which is moveably held in or on the adapter element. In particular, if the locking device at the longitudinal axis of the shaft element and thus also at the longitudinal axis of the neck section or the adapter element should be linearly movable, the embodiment of the locking device is suitable as a slide element that is guided in or on the adapter element or at least within the neck section in a moveably sliding manner. The slide element can then be manually moved so that it is pushed forward towards the rosette to lock the adapter element and thus also the handle on the rosette and the slide element can be manually retracted to release the rotational mobility of the handle around the longitudinal axis again.

As an alternative to a rotational mobility of the slide element around the longitudinal axis or as an alternative to a nobility of the slide element that is transverse to the longitudinal axis, it is particularly favourable if the slide element is moveably guided parallel to or with the longitudinal axis of the shaft element in or on the adapter element, because the slide element can then be directly moved in and out of the blocking position manually.

The rosette comprises a recess for lockability, into which a blocking section of the locking device in the blocking position is inserted. The locking device, in particular, in the form of the slide element, can comprise an oblong extension with a cross-section, which is square for example, and the blocking section forms, for example, a front section or a continuation of the slide element, which can be inserted into the recess of the rosette. The remaining oblong body of the slide element remains in the complementary holder in or on the adapter element.

The holder for the locking device in the adapter element is favourably a guide groove in the adapter element so that the locking device, in particular, the form of the slide element, is moveably guided in the guide groove at the longitudinal axis. In this case, favourably, the embodiment of the neck section can be used, and the guide groove can be united by means of the tube-shaped neck section into a guide channel, in which the locking device is held and guided.

In accordance with a favourable further embodiment of the door fitting, the neck section of the handle comprises an opening, through which an operating element is guided, via which the locking device can be manually moved. The opening is favourably oblong at the longitudinal axis, for example, as a slot or as a sliding block, and the operating element can be a tappet, a protruding pin or a flat sliding knob, which is operated from the outer side of the neck section and thus a manual mobility of the locking device can be achieved, in particular, if the locking device is designed as a slide element. If the operating element is designed as a sliding knob, it can essentially completely cover the opening the neck section, and, if the operating, element is designed as a sliding stud, as a sliding pin, as a sliding tappet or as another sliding shaft; the width of the oblong opening can correspond to the diameter or width of the operating element.

Being furthermore favourable, at the position of the operating element within the opening, it can already be visually detected whether the handle of the door fitting is locked or not. In particular, a visible side of the locking device, in particular, or the slide element, being visible through the opening, can be colour-marked in such a way that the slide element appears, for example, in red if this is located in the blocking position, and the slide element can appear, for example, in green if this is again guided out of the blocking position.

A favourable further embodiment of the door fitting according to the invention provides that, through the shaft element, an oblong emergency release element is guided, which extends from the lockable handle to an opposite handle. The shaft element is designed, for example, as a multi-edge element and, in particular, as a square element, and the shaft element comprises an inner-side passage, through which the emergency release element is guided, for example, in accordance with the embodiment of utility model document German Patent No. DE 20 2013 011 573 U1. The emergency release element can be designed as a flat rod, and if a rotational movement is introduced into the emergency release element from the side of the opposite handle, it can be provided in accordance with a further embodiment of the invention that the emergency release element interacts with the locking device in such a way that a rotational movement of the emergency release element guides the locking device out of the blocking position in the rosette. Thus, particularly in an emergency, also from the non-lockable handle of the door fitting, the locking device arranged in or on the neck section can be guided out of the blocking position again, wherein the rotational movement into the emergency release element can originate from the non-lockable handle.

The emergency release element, for example, designed as a flat rod, can be connected with an end side on the non-lockable handle to a tool holder element, and a user of the door fitting can, for example, using a screwdriver or with a coin, introduce a rotational movement from the non-lockable, in particular, handle located outside a room into the emergency release element, which then interacts with the locking device in such a way that the rotational movement in the emergency release element triggers a shifting movement of the locking device. As a consequence, the latter can be guided out of the blocking position in the rosette.

For example, a screw element is provided, which is rotationally connected to the emergency release element and comprises at least one screw channel, on which a projection of the locking device is guided along in such a way that, with a rotational movement that can be introduced into the screw element, the locking device can be moved out of the blocking position at the longitudinal axis.

The emergency release element can, for example, be connected in a simple way to the screw element in a positive-locking manner so that the rotational movement of the emergency release element can be transferred into the screw element. On the opposite side of the emergency release element, the tool holder element can also only be connected in a rotationally rigid manner to the emergency release element, in particular, in a positive-locking manner.

In an alternative embodiment of the door fitting with an emergency release element, this is formed as a tappet, into which a thrust movement can be introduced from the side of the opposite handle, and wherein the emergency release element interacts with the locking device in such a way that a thrust movement of the emergency release element guides the locking device out of the blocking position in the rosette.

For this purpose, for example, an entrainment element is provided, which is shear-connection to the tappet and has a formation, which is connected in a positive-locking manner to a projection of the locking device in such a way that, with a thrust movement introduced into the entrainment element with the emergency release element at the longitudinal axis, the locking device can be moved out of the blocking position. The neck section of the handle preferably comprises, on the side opposite the locking device, an end-face opening, via which the emergency release means is accessible for the purpose of introducing the thrust movement by means of a pin or the like.

In addition, the emergency release element of the aforementioned embodiment can comprise a signal surface, wherein the opposite handle is formed with an opening in such a way that, in the blocking position of the locking device, the signal surface is visible through the opening and indicates locking. Preferably, the end face of the oblong emergency release element serves as a signal surface, which is covered for this purpose, for example, with red colour. The opening of the handle through which the signal surface is visible corresponds in this case to the aforementioned opening on the front side of the neck section.

Furthermore, in the neck section of the lockable handle, a magnetic element can be held, which magnetically pulls the locking device into the blocking position and/or secures the locking device in this and which magnetically pulls the locking device into a release position and/or secures this in the release position. The magnetic element s, for example, designed as a round magnetic disk and adjacent to the screw element in the neck section stationary, in particular, the magnetic element in the adapter element can be firmly arranged.

It is particularly favourable if the magnetic element interacts with a first contact surface of the locking device to pull it into the blocking position and/or secure it in this, wherein the magnetic element interacts with a second contact surface of the locking device to pull it into the release position and/or secure it in this.

The particularly opposite contact surfaces can be formed on the inside side at projections of the slide element, and the disc-shaped magnetic element, for example, is located between the two opposite projections. The magnetic element is enclosed between the two contact surfaces, and a user moves the slide element into the blocking position. In this way, the mutually opposite attraction of the magnet to the contact surfaces generates a piece of haptic information concerning that the locking device has been moved into the blocking position, and if the slide element is transferred to the release position, a piece of haptic information is also provided via the magnet's attraction in such a way that the user is informed about whether the blocking position or the release position is present.

BRIEF DESCRIPTION OF THE DRAWINGS

Further measures to enhance the invention are presented below together with the description of a preferred exemplary embodiment of the invention on the basis of the figures.

The Figures Show.

DETAILED DESCRIPTION OF THE INVENTION

Figure 1:
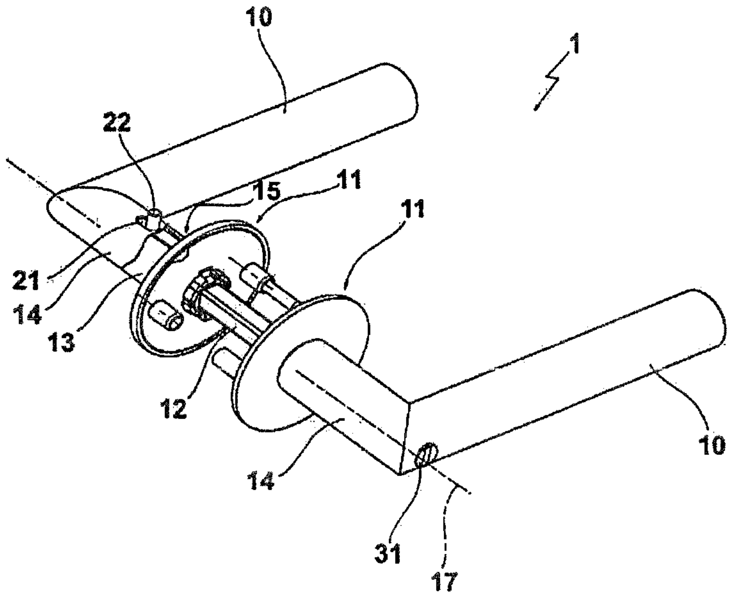
FIG. 1 a perspective view of a door fitting with a handle that can be locked on one side and a locking device for manual locking of the handle.

FIG. 1 represents in a perspective view a door fitting 1 with a handle that can be locked on one side 10 according to the invention. In a basically known way, the door fitting 1 comprises two handles 10, and one handle 10 can, with reference to a door leaf (not shown), be located on an inner side, and one handle 10 can be located on an outside of a room. The handle 10 that can be locked can be located on the inside of the door.

The door 1 furthermore comprises rosettes 11, which are designed for contact with the door leaf and a shaft element 12 is shown, which extends between the two handles 10 and passes through the locking mechanism of a lock case, which can be inserted into the door leaf. The handles 10 comprise neck sections 14, and in the neck sections 14 are adapter elements 13, in particular, for connecting the handles 10 to the shaft element 12 in a rotationally rigid manner.

For this purpose, the shaft element 12 with its ends extends in sections into a respective inner passage of the adapter elements 13, and the neck section 14 of the handles 10 is applied externally on the adapter element 13 in a rotationally rigid manner.

The neck section 14 of the handle 10 that is lockable is shown in a broken-up manner so that the adapter element 13 is visible in the neck section 14. A locking device 15 is held in the adapter element 13, and for actuating the locking device 15, this has an operating element 22 for manual operation, which extends through an opening 21 in the neck section 14.

If the locking device 15 is moved by manual actuation of the operating element 22 in the direction of the rosette 11, then the locking device 15 engages with the rosette 11 in a positive-locking manner, and since the locking device 15 is held in the adapter element 13 in a positive-locking manner, and since the handle 10 is held on the adapter element 13 in a rotationally rigid manner, a mobility of the handle 10 can be blocked by a longitudinal axis 17. In the locking state, both handles are blocked 10 since these are connected to each other via the shaft element 12. The locking of the handles 10 can however be triggered only by one side of the two handles 10, wherein the handle 10 that comprises the locking device 15 and thus also comprises the operating element 22, for example, is attached on an inner side of a room, for example, a toilet room or a meeting room, etc. IF the handles 10 are to be released again, the locking device 15 must be moved away from the rosette 11 via the operating element 22 in such a way that this is disengaged from the rosette 11. On the handle 10 that is not designed with the locking device 15, the tool holder element 31 for the emergency release of the locked handle 10 is located on the back side of the neck section 14.

Figure 2:
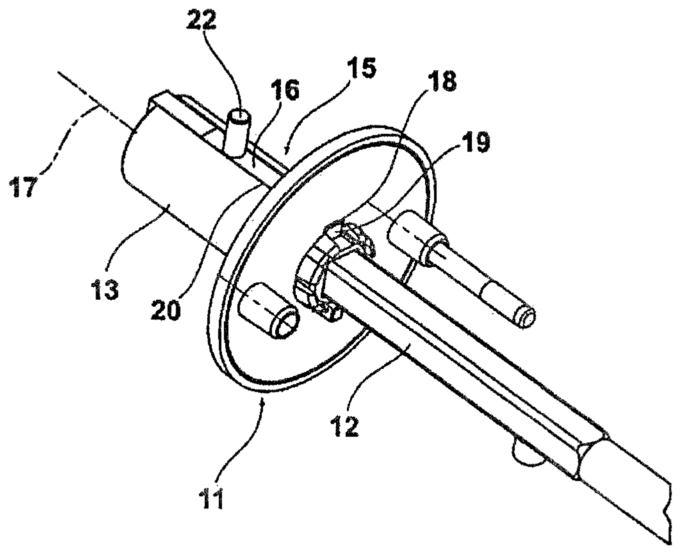
FIG. 2 a detailed view of an adapter element of the lockable handle in which the locking device is held.

FIG. 2 shows a more detailed view of the adapter element 13, in which the locking device 15 is included, which is formed as a slide element 16. The operating element 22 is mounted on the top side of the slide element 16 as part of the locking device 15, which is designed as a cylinder pin. The slide element 16 is inserted into a guide groove of the adapter element 13 in such a way that this can be shifted axially at the longitudinal axis 17. For the positive-locking engagement of the slide element 16 into the rosette 11, this comprises a blocking section 19 that can be inserted into a recess 18 in the rosette 11.

Figure 3:
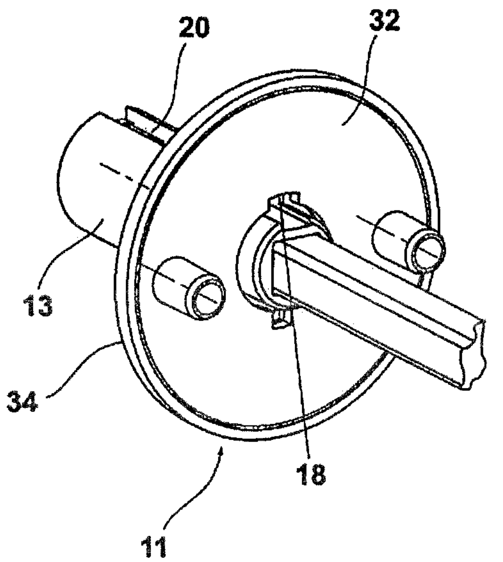
FIG. 3 a detailed view of the adapter element and the rosette on which the adapter element can be rotated.

FIG. 3 shows another perspective view of the rosette 11 and the adapter element 13, and the recess 18 in the rosette 11 is inserted corresponding to the guide groove 20 in the adapter element 13. If, in accordance with FIG. 2, the slide element 16 is pushed forward in the direction of the rosette 11, then the blocking section 19 enters into the recess 18 of the rosette 11 and blocks a twisting motion of the adapter element 13 and thus also the handle 10 relative to the rosette 11, which is rigidly attached to a door leaf in the built state of the door fitting 1.

In accordance with the exemplary embodiment, the rosette 11 comprises a reinforcement element 32 and a covering element 34, wherein the recess 18 is inserted in such a way into the reinforcement element 32 made of a thicker metal sheet that also weak levels of torque force manually introduced into the adapter element 13 do not result in damage to the recess 18, and wherein the cover element 34 can comprise a thinner material, in particular, being made of metallic or also a non-metallic material.

Figure 4:
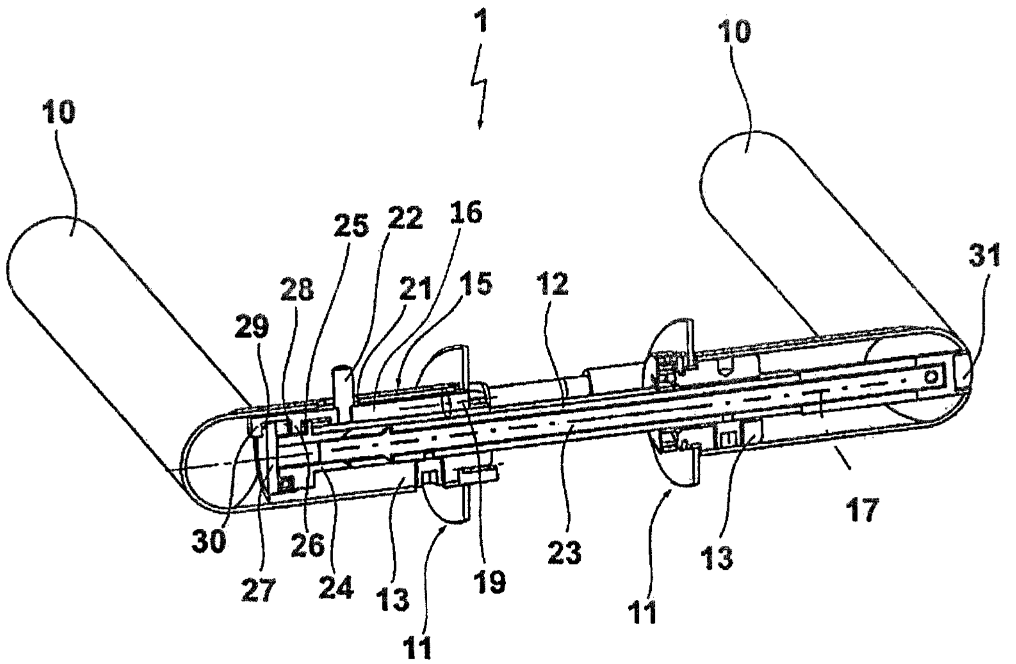
FIG. 4 a cross-sectional overall view through the door fitting in accordance with FIG. 1.

FIG. 4 shows a cross-section through the door fitting 1 with the two handles 10 and the two rosettes 11. The adapter elements 13 are inserted in the neck sections 14 of the handles 10, and the slide element 16, which forms the locking element 15, is held in the left adapter element 13. The cross-section shows the slide element 16 with the operating element 22, which extends through the opening 21 in the neck section 14 for manual operation.

An emergency release element 23 extends through the shaft element 12, which emergency release element 23 is connected on the side of the arrangement of the locking device 15 with a screw element 24 in a rotationally rigid manner. Thus, one end of the oblong emergency release element 23 arranged on the screw element 24 and the opposite end of the emergency release element 23 is connected to a tool holder element for emergency releasing.

If the door fitting 1 is to be not emergency-released in a blocking position, a rotational movement can be introduced into the emergency release element 23 on the side of the right handle 10 with a tool via the tool holder element 31, whereby a rotational movement in the screw element 24 is also generated. A projection 26 on the locking device 15 is moved away by a screw channel 25 of the screw element 24 at the longitudinal axis 17 away from the rosette 11, whereby the locking device 15 can be disengaged from the rosette 11.

On the back to the screw element 24, a magnetic element 27 is inserted into the adapter element 13, which magnetic element 27 can interact with a first contact surface 28 and an opposite contact surface 29 magnetically, which contact surfaces 28 and 29 at the projection 26 and at a rear projection 30 are formed opposite each other.

The illustration shows the locking element 15 in the blocking position by a front blocking section 19 of the locking device 15 engaging into the rosette 11 in a positive locking manner. In this position shown, the second contact surface 29 at the rear projection 30 comes into contact with the magnetic element 27 in such a way that the locking device 15 is held in the blocking position and snaps into this. If the locking device 15 is pulled back out of the rosette 11 by operating it manually, the contact of the magnetic element 27 with the second contact surface 29 is released and the first contact surface 28 is attracted by the magnetic element 27, which is attached to the projection 26. In this release position, the locking device 15 is also held and snapped via the magnetic element 27. Via the magnetic element 27, with the respective magnetic snapping, a haptic for operating the locking device 15 is generated in such a way that a detest position for an operator can be felt at each axial end position of the locking device 15 along the longitudinal axis 17.

Figure 5:
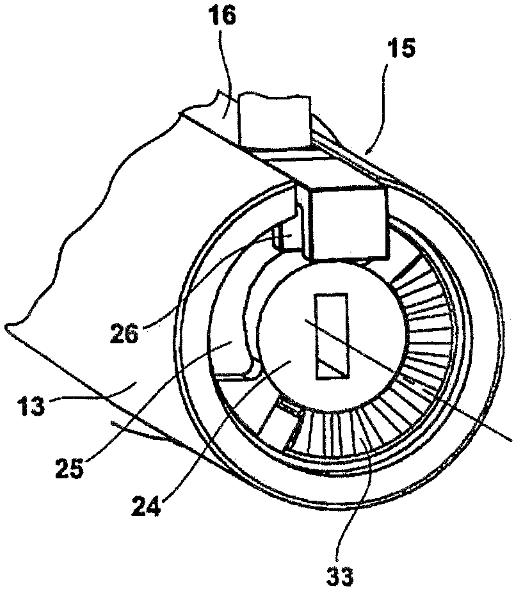
FIG. 5 a detailed view of a screw element in arrangement in the adapter element in a basic position.

FIG. 5 shows a perspective view of the adapter element 13 with the locking device 15 in the form of the slide element 16 in a blocking position. Furthermore, the cross-sectional view shows the screw element 24 with the screw channel 25. In this case it can be recognized in the view that the projection 26 with a flank at the screw channel 25 of the screw element 24 is attached. The axial position of the slide element 16 is shown in the direction of the rosette (not shown) in such a way that the locking device 15 is located in the blocking position. The screw element 24 is pre-tensioned with a spring element 333 in a resting position, so that this rotary preload also results for the emergency release element. If the emergency release is to be activated, the screw element 24 is rotated accordingly against the force of the spring element 33, as is further shown in FIG. 6.

Figure 6:
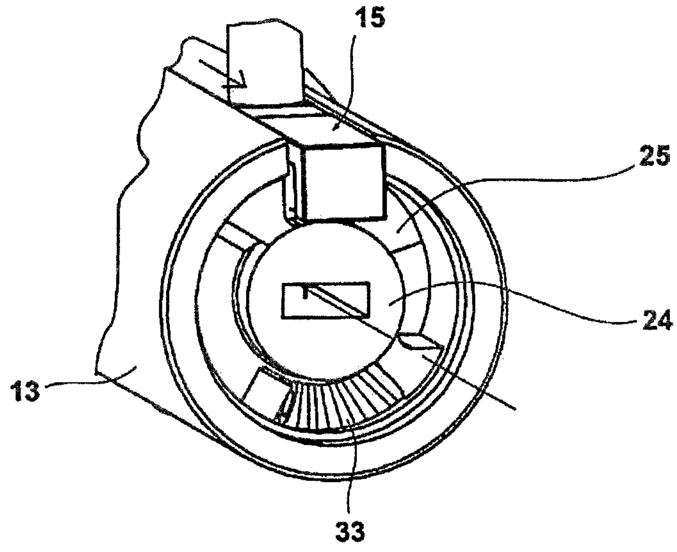
FIG. 6 a view of the screw element in accordance with FIG. 5 in an activated position for the transfer of the slide element from a blocking position to a release position, FIG. 7 a cross-cut overall view of a door fitting a blocking position with an alternative emergency release.

FIG. 6 shows the view of the adapter element 13 with the locking device 15 in a now unlocked position, wherein the screw element 24 has been twisted, and wherein the twisting against the force of the spring element 33 has occurred. Due to the fact that the projection 26 (see FIG. 5) could slip on the screw channel 25, the locking device 15 has been moved away From the rosette in the arrow direction shown in such a way that the twisting of the screw element 24 transfers the locking device 15 from the blocking position into the release position. If the twisting movement via the emergency release element 23 is not held any further, the spring element 33 returns the rotational movement of the screw element 24.

Due to the tact that the projection on the locking device 15 only rests on one side on the screw channel 25 of the screw element 24, due to the return of the rotational movement of the screw element 24 via the spring element 33 into the resting position shown in FIG. 5, the locking device 15 is not transferred into the blocking position again. Only in this way can a re-locking of the handle 10 via the locking device 15 occur. Otherwise, after each emergency release, the user would have to turn back the locking device 15 himself/herself in order to be able to lock the handle 10 normally again during use. In addition, the spring element 33 is necessary to ensure in an actuation of the handle 10 that the screw element 24 does not rotate in an undefined manner along with or this can twist and possibly remains so that a locking of the handle 10 with the locking device 15 is no longer possible.

Figure 7:
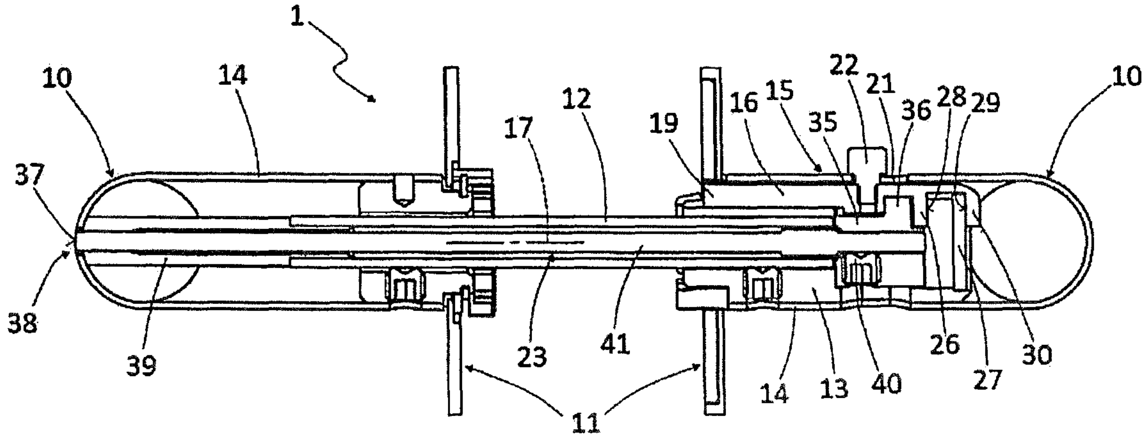
Figure 8:
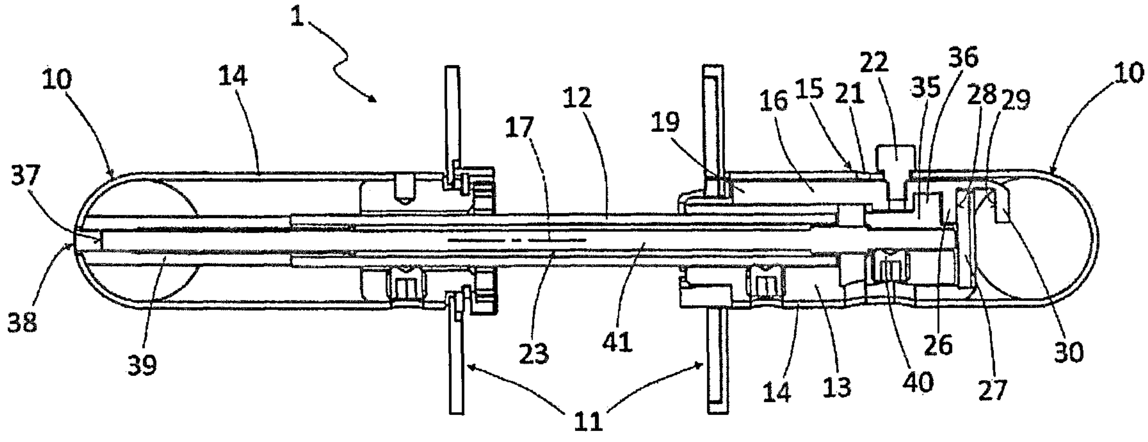
FIG. 8 a cross-sectional overall view of the door fitting in accordance with FIG. 7 with the alternative emergency release in release position.

FIGS. 7 and 8 show cross-sectional overall views of a door fitting 1 in locking or release position of the locking device 15. The door fitting 1 comprises the emergency release means 23 in the form of the tappet 41, via which, by means of introducing an axial thrust movement from the side of the opposite, meaning left, handle 10, the locking device 15 can be transferred from the blocking into the release position.

On the side of the locking device 15, the tappet 41 is shear-connected to the entrainment element 35 by means of the grub screw 40 meaning that the entrainment element 35 is carried along with during movement of emergency release element 23 along the longitudinal axis 17. The entrainment element 35 comprises the formation 36 protruding on the top side, which is engaged with the locking device 15 and, in particular, is connected in a positive locking manner to the projection 26. Via this positive-locking connection, an axial thrust movement of the emergency release element 3 is transferred to the locking device 15 and the blocking section 19 of the slide element 16 is pushed back out of the rosette 11 in such a way that the locking device 15 is transferred out of the blocking position shown in FIG. 7 to the release position shown in FIG. 8. In this case, the holding force exerted by the magnetic element 27 on the second contact surface 29 must be overcome.

On the opposite side of the door fitting 1 opposite the locking device 15, the neck section 14 of the handle 10 comprises the end-face opening 38, which makes access to the emergency release element 23 possible. For the purpose of emergency release, an object passing through the opening 38, for example, a pin, is brought into contact with the end face of the emergency release element 23 and then a thrust movement at the longitudinal axis 17 is introduced into the emergency release element 23, which leads to the release of the locking device 15 in the manner previously described. The emergency release element 23 is guided through the guide sleeve 39 pressed into the inner of the shaft element 12.

The end face of the emergency release element 23 is designed as signal surface 37 by being coloured with a signal colour, in particular red, for example, being painted. In the blocking position of the locking device 15 shown in FIG. 7, the signal surface 37 is flush with the contour of the handle 10 in such a way that the signal surface 37 is visible from the outside and signalizes the locked state of the door fitting 1. In the case of the release position shown to FIG. 8, the signal surface 37 is inserted into the interior of the spindle element 12 and thus effectively no longer visible from the outside.

The invention in its embodiment is not limited to the preferred exemplary embodiment given above. Rather, a number of variants is conceivable that makes use of the presented solution even in the case of fundamentally different embodiments. All features an or advantages resulting from the claims, the description or the drawings, including constructive details or spatial arrangements, can be significant to the invention both by themselves as well as in a wide variety of combinations.

REFERENCE LIST

1 door fitting
10 handle
11 rosette
12 shaft element
13 adapter element
14 neck section
15 locking device
16 slide element
17 longitudinal axis
18 recess
19 blocking section
20 guide groove
21 opening
022 operating element
23 emergency release element
24 screw element
25 screw channel
26 projection
27 magnetic element
28 first contact surface
29 second contact surface
30 rear projection
31 tool holder element
32 reinforcement element
33 spring element
34 cover element
35 entrainment element
36 formation
37 signal surface
38 opening
39 guide sleeve
40 grub screw
41 tappet

The invention claimed is:

1. A door fitting having a handle that can be locked on one side, comprising at least one rosette for contact with a door leaf and a shaft element for forming an operative connection to a locking mechanism of a lock unit fitted into the door leaf, and an adapter element fitted in a neck section of the handle and being held on the shaft element, wherein the door fitting further comprises:

a locking device held in or on the neck section of the handle, which is brought, by manual actuation, into a blocking position, in which the handle is rotationally blocked against the at least one rosette by the locking device, whereby through the shaft element, an oblong emergency release element is guided, which extends from the handle to an opposite handle; and wherein a rotational movement is introduced into the oblong emergency release element from a side of the opposite handle, and wherein the oblong emergency release element interacts with the locking device in such a way that a rotational movement of the oblong emergency release element guides the locking device out of the blocking position in the rosette.

2. The door fitting according to claim 1, wherein the locking device is formed by a slide element which is movably held in or on the adapter element.

3. The door fitting according to claim 2, wherein the slide element is moveably guided in or on the adapter element parallel to a longitudinal axis of the shaft element in order to move the slide element manually into and out of the blocking position.

4. The door fitting according claim 3, wherein the adapter element has a guide groove in which the locking device is guided at the longitudinal axis.

5. The door fitting according to claim 4, wherein the guide groove is formed into a closed guide channel by the neck section and the locking device is held and guided within the guide groove.

6. The door fitting according to claim 1, wherein the rosette has a recess, into which a blocking section of the locking device is deposited in the blocking position.

7. The door fitting according to claim 1, wherein the neck section comprises an opening, through which an operating element is guided, via which the locking device can be manually moved.

8. The door fitting according to claim 1, further comprising:

a screw element connected to the emergency release element and the screw element comprises at least one worm gear, on which a projection of the locking device is guided along in such a way that the locking device is moved along a longitudinal axis out of the blocking position with a rotational movement introduced into the screw element by the oblong emergency release element.

9. The door fitting according to claim 1, further comprising:

an entrainment element, which is shear-connected to the tappet and the entrainment element comprises a formation connected to a projection of the locking device in a positive-locking manner in such a way that with a thrust movement introduced into the entrainment element using the tappet at a longitudinal axis, the locking device is moved out of the blocking position.

10. The door fitting according to claim 1, wherein the oblong emergency release element comprises a signal surface, wherein the opposite handle is formed with an opening in such a way that in the blocking position of the locking device the signal surface is visible through the opening and indicates a locking.

11. The door fitting according to claim 1, whereby in the neck section of the handle, a magnetic element is held, which magnetically pulls the locking device into the blocking position and/or secures it and that magnetically pulls the locking device into a release position and/or secures it.

12. The door fitting according to claim 11, wherein the magnetic element acts with a first contact surface of the locking device to pull it into the release position and/or secure it and wherein the magnetic element interacts with a second contact surface of the locking device to pull it into the blocking position and/or secure it.

13. A door fitting having a handle that can be locked on one side, comprising at least one rosette for contact with a door leaf and a shaft element for forming an operative connection to a locking mechanism of a lock unit fitted into the door leaf, and an adapter element fitted in a neck section of the handle and being held on the shaft element, wherein the door fitting further comprises:

a locking device held m or on the neck section of the handle, which is brought, by manual actuation, into a blocking position, in which the handle is rotationally blocked against the at least one rosette by the locking device, whereby through the shaft element, an oblong emergency release element is guided, which extends from the handle to an opposite handle; and wherein the oblong emergency release element is formed as a tappet, into which a thrust movement is introduced from a side of the opposite handle, and wherein the oblong emergency release element interacts with the locking device in such a way that a thrust movement of the oblong emergency release element guides the locking device out of the blocking position in the rosette.

* * * * *